United States Patent
Abdollahi et al.

(10) Patent No.: US 11,000,922 B2
(45) Date of Patent: May 11, 2021

(54) ROBOTIC WELDING SYSTEM

(71) Applicant: Novarc Technologies Inc., North Vancouver (CA)

(72) Inventors: Abdolreza Abdollahi, North Vancouver (CA); Hassan Bateni, West Vancouver (CA); Soroush Karimzadeh, North Vancouver (CA)

(73) Assignee: NOVARC TECHNOLOGIES INC., North Vancouver (CA)

( * ) Notice: Subject to any disclaimer, the term of this patent is extended or adjusted under 35 U.S.C. 154(b) by 0 days.

(21) Appl. No.: 16/866,451

(22) Filed: May 4, 2020

(65) Prior Publication Data

US 2020/0262011 A1    Aug. 20, 2020

Related U.S. Application Data

(63) Continuation of application No. 16/089,706, filed as application No. PCT/CA2017/050371 on Mar. 23, 2017, now Pat. No. 10,661,396.
(Continued)

(30) Foreign Application Priority Data

Apr. 29, 2016    (CA) .................................. CA 2928413

(51) Int. Cl.
  *B23K 37/02*    (2006.01)
  *B23K 9/028*    (2006.01)
  (Continued)

(52) U.S. Cl.
  CPC ........ *B23K 37/0229* (2013.01); *B23K 9/0286* (2013.01); *B23K 9/16* (2013.01);
  (Continued)

(58) Field of Classification Search
  CPC ............ B23K 2101/06; B23K 37/0229; B23K 37/0276; B23K 37/0282; B23K 37/0426;
  (Continued)

(56) References Cited

U.S. PATENT DOCUMENTS 5,834,916 A    11/1998    Shimogama et al.
8,105,008 B2    1/2012    Givens
(Continued)

FOREIGN PATENT DOCUMENTS

CN    101456182 A    6/2009
CN    101456182 B    3/2012
(Continued)

OTHER PUBLICATIONS

"What are six axis robots?", robots.com, http://web.archive.org/web/20150521080553/http://www.robots.com:80/faq/show/what-are-six-axis-robots, May 21, 2015.
(Continued)

*Primary Examiner* — Muhammad S Islam
(74) *Attorney, Agent, or Firm* — Dentons Canada LLP

(57) ABSTRACT

A robotic welding system comprises a supporting arm for attaching to a repositionable support structure, the supporting arm comprising a first mounting portion connectable to the repositionable support structure, and a second mounting portion rotatably coupled to the first mounting portion. A yaw rotary actuator rotates the second mounting portion about a yaw axis. A welding arm comprises a third mounting portion rotatably coupled to the second mounting portion of the supporting arm. A pitch rotary actuator rotates the third mounting portion about a pitch axis generally perpendicular to the yaw axis. A roll rotary actuator rotates a torch holder shaft about a roll axis generally perpendicular to the pitch axis. The shaft has a torch mounting portion for mounting a welding torch at an end thereof. A controller is operably
(Continued)

coupled to the actuators to cause the welding torch to execute a welding pattern.

1 Claim, 12 Drawing Sheets

Related U.S. Application Data

(60) Provisional application No. 62/315,968, filed on Mar. 31, 2016.

(51) Int. Cl.
*B23K 37/04* (2006.01)
*B25J 9/16* (2006.01)
*B25J 9/04* (2006.01)
*B23K 9/16* (2006.01)
*B23K 101/06* (2006.01)

(52) U.S. Cl.
CPC ...... *B23K 37/0276* (2013.01); *B23K 37/0282* (2013.01); *B23K 37/0426* (2013.01); *B25J 9/04* (2013.01); *B25J 9/1682* (2013.01); *B23K 2101/06* (2018.08); *G05B 2219/39132* (2013.01)

(58) Field of Classification Search
CPC .. B23K 9/0286; B23K 9/16; B25J 9/04; B25J 9/1682; G05B 2219/39132
See application file for complete search history.

(56) References Cited

U.S. PATENT DOCUMENTS

| | | |
|---|---|---|
| 2001/0045420 A1 | 11/2001 | Bong et al. |
| 2008/0128400 A1 | 6/2008 | Michels et al. |
| 2010/0204646 A1 | 8/2010 | Plicchi et al. |
| 2011/0186556 A1 | 8/2011 | Heinrich et al. |
| 2012/0298640 A1* | 11/2012 | Conrardy ............... B23K 9/32 219/130.01 |
| 2014/0027496 A1 | 1/2014 | Castillo |
| 2014/0134580 A1* | 5/2014 | Becker ............... G09B 19/003 434/234 |
| 2015/0081095 A1 | 3/2015 | Shiraki et al. |
| 2015/0360313 A1 | 12/2015 | Andersen |

FOREIGN PATENT DOCUMENTS

| | | |
|---|---|---|
| EP | 0577437 B1 | 10/1999 |
| WO | 2007/088208 A1 | 8/2007 |

OTHER PUBLICATIONS

Examiner's Report issued in connection with Canadian Patent Application No. 2,928,413, Canadian Intellectual Property Office, dated May 12, 2017.
International Search Report and Written Opinion for PCT/CA2017/050371, International Searching Authority, dated Jun. 19, 2017.
Response to Examiner's Report dated May 12, 2017 as filed with the Canadian Intellectual Property Office dated Aug. 14, 2017 in connection with Canadian Patent Application No. 2,928,413.
Examiner's Report issued in connection with Canadian Patent Application No. 2,928,413, Canadian Intellectual Property Office, dated Sep. 28, 2017.
Response to Examiner's Report dated Sep. 28, 2017 as filed with the Canadian Intellectual Property Office dated Dec. 27, 2017 in connection with Canadian Patent Application No. 2,928,413.
Examiner's Report issued in connection with Canadian Patent Application No. 2,928,413, Canadian Intellectual Property Office, dated Feb. 28, 2018.
Response to Examiner's Report dated Feb. 28, 2018 as filed with the Canadian Intellectual Property Office dated Apr. 17, 2018 in connection with Canadian Patent Application No. 2,928,413.
Examiner's Report issued in connection with Canadian Patent Application No. 2,928,413, Canadian Intellectual Property Office, dated Jun. 7, 2018.
Response to Examiner's Report dated Jun. 7, 2018 as filed with the Canadian Intellectual Property Office dated Sep. 7, 2018 in connection with Canadian Patent Application No. 2,928,413.
Extended European Search Report issued in connection with European Patent Application No. 17772899.5, European Patent Application No. 17772899.5, European Patent Office, dated Jan. 16, 2020.
Examination Report issued in connection with European Patent Application No. 17772899.5, European Patent Office, Dec. 18, 2020.

\* cited by examiner

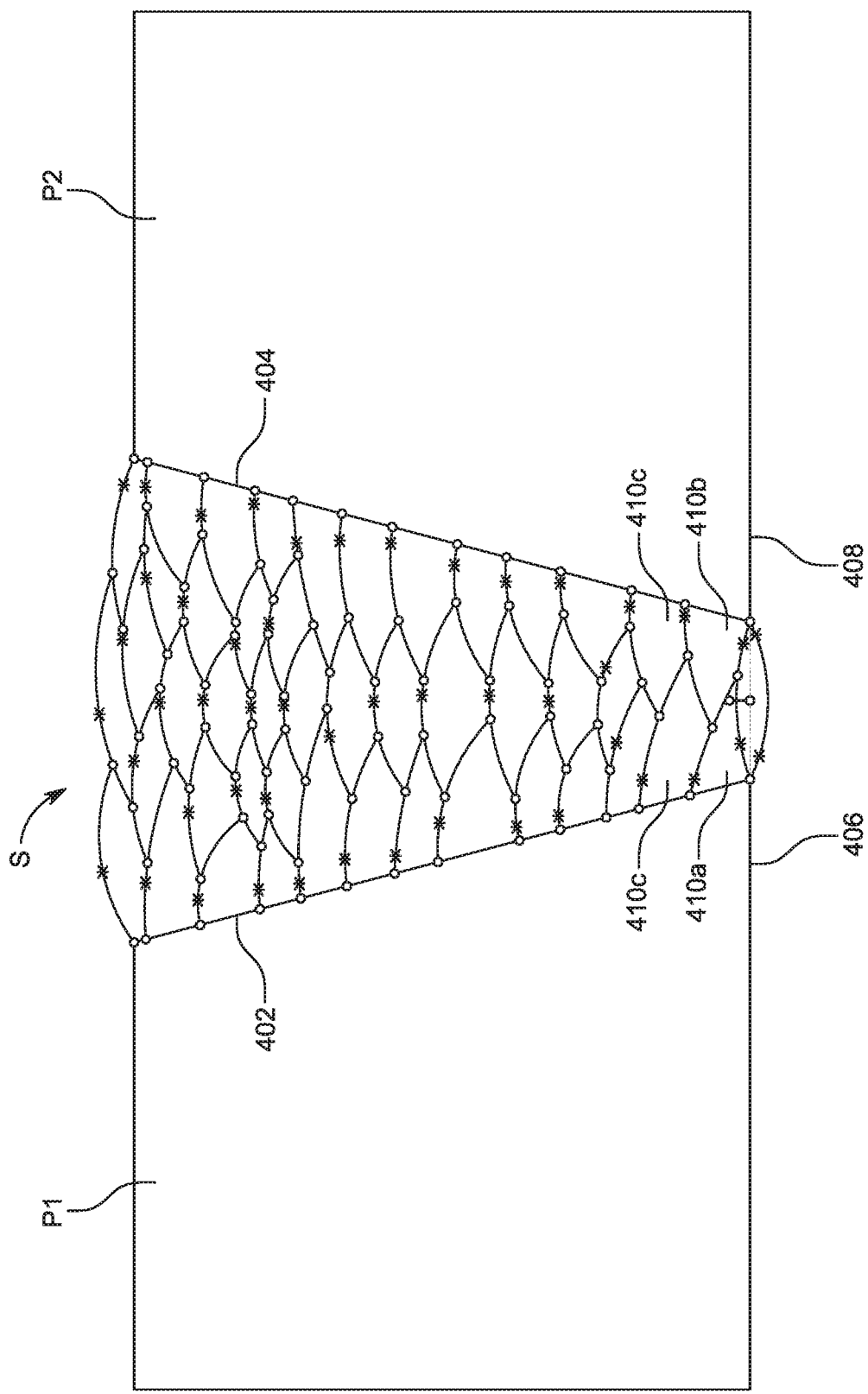

ROBOTIC WELDING SYSTEM

CROSS REFERENCE TO RELATED APPLICATIONS

This application is a continuation of U.S. patent application Ser. No. 16/089,706 filed on Sep. 28, 2018, which is the US national stage of International Patent Application No. PCT/CA2017/050371 filed on Mar. 23, 2017, which in turn claims the benefit of priority of U.S. Provisional Patent Application No. 62/315,968 filed on Mar. 31, 2016 and Canadian Patent Application No. 2,928,413 filed on Apr. 29, 2016. U.S. patent application Ser. No. 16/089,706, International Patent Application No. PCT/CA2017/050371, U.S. Provisional Patent Application No. 62/315,968 and Canadian Patent Application No. 2,928,413 are hereby incorporated herein by reference in their entirety.

TECHNICAL FIELD

The present disclosure relates to robotic welding assemblies.

BACKGROUND

The process of welding lengths of pipe together, or segments of other round objects, is sometimes referred to as "spool welding". In one type of typical spool welding operation, pipe sections are held together, for example by clamps or the like, and supported by a device called a "positioner" that rotates the pipe sections about a common longitudinal axis. As the pipe sections rotate, they are welded together by a welding torch that deposits material along a seam between the pipe sections.

The inventors have identified a need for improved systems, apparatus and methods for performing spool welding operations.

SUMMARY

One aspect of the present disclosure provides an apparatus comprising a repositionable support structure and a collaborative robotic welding system attached to the repositionable support structure. The collaborative robotic welding system comprising a supporting arm, a welding arm, a plurality of rotary actuators for moving the supporting arm and the welding arm, at least one safety encoder associated with one of the rotary actuators, and a controller operably coupled to the plurality of rotary actuators and the at least one safety encoder and configured to control motion of the robotic system while limiting a force applied by at least one of the rotary actuators.

Another aspect of the present disclosure provides a robotic welding system comprising: a supporting arm for attaching to a repositionable support structure, the supporting arm comprising a first mounting portion connectable to the repositionable support structure, and a second mounting portion rotatably coupled to the first mounting portion; a yaw rotary actuator operably connected to the first mounting portion and the second mounting portion and configured to rotate the second mounting portion in relation to the first mounting portion about a yaw axis; a welding arm comprising a third mounting portion rotatably coupled to the second mounting portion of the supporting arm, the welding arm extending toward a welding side of the supporting arm; a pitch rotary actuator connected between the second mounting portion of the supporting arm and a third mounting and configured to rotate the third mounting portion in relation to the second mounting portion about a pitch axis generally perpendicular to the yaw axis; a roll rotary actuator connected between the third mounting portion and a torch holder shaft and configured to rotate the torch holder shaft in relation to the third mounting portion about a roll axis generally perpendicular to the pitch axis, the torch holder shaft comprising a torch mounting portion at an end thereof configured for mounting a welding torch; and a controller operably coupled to the yaw, pitch and roll rotary actuators and configured to control motion of the torch holder shaft to cause the welding torch to execute a welding pattern.

Further aspects and details of example embodiments of the present disclosure are described below.

DRAWINGS

The following figures set forth embodiments in which like reference numerals denote like parts. Embodiments are illustrated by way of example and not by way of limitation in the accompanying figures.

FIG. 6 is a cross-section of two pipe segments welded together by a multiple pass welding process.

DETAILED DESCRIPTION

Figure 1:
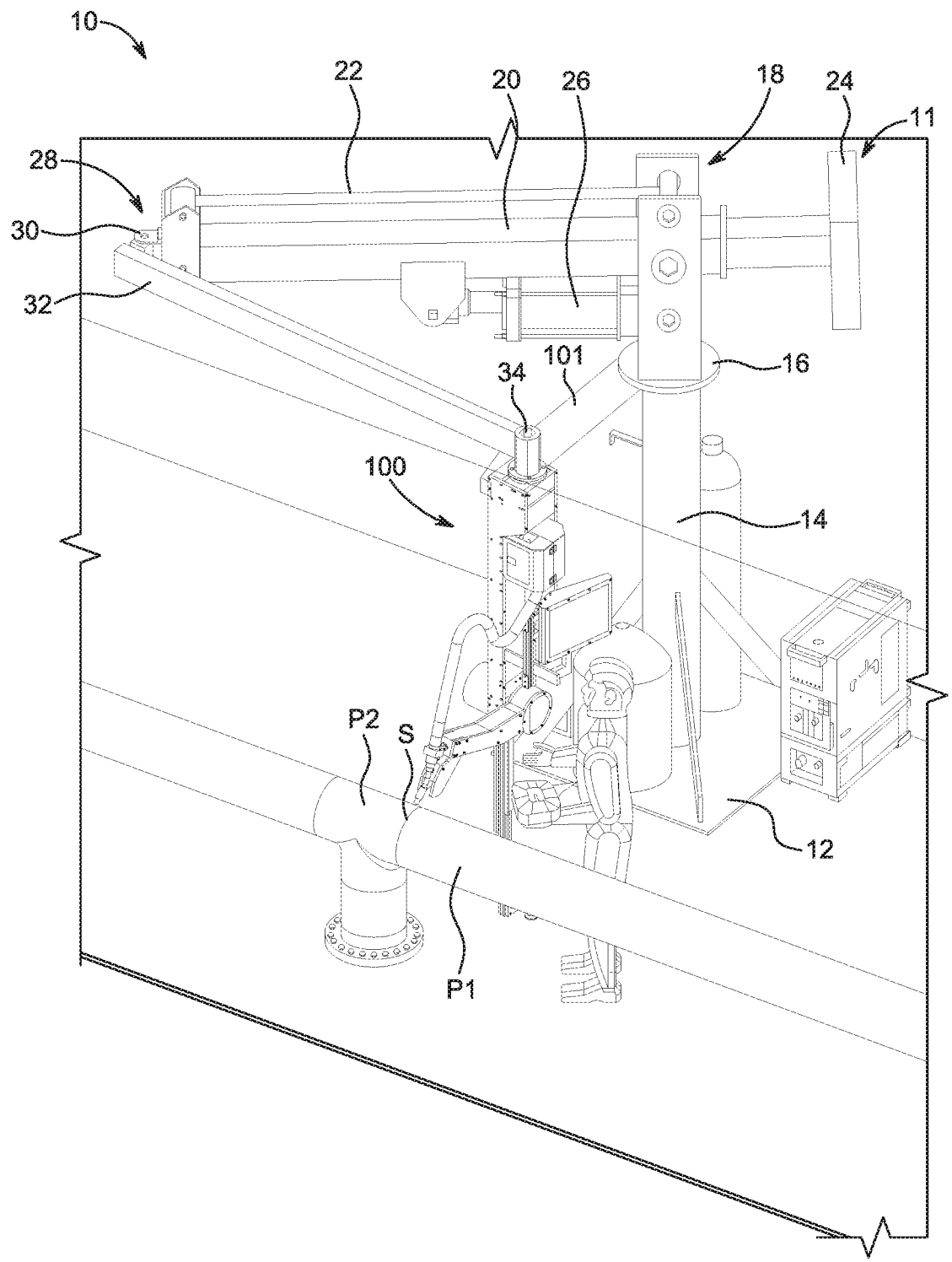
FIG. 1 is a perspective view of an example welding shop apparatus comprising a robotic welding system supported by a repositionable support structure set up for a pipe welding operation according to one embodiment of the present disclosure.
Figure 1A:
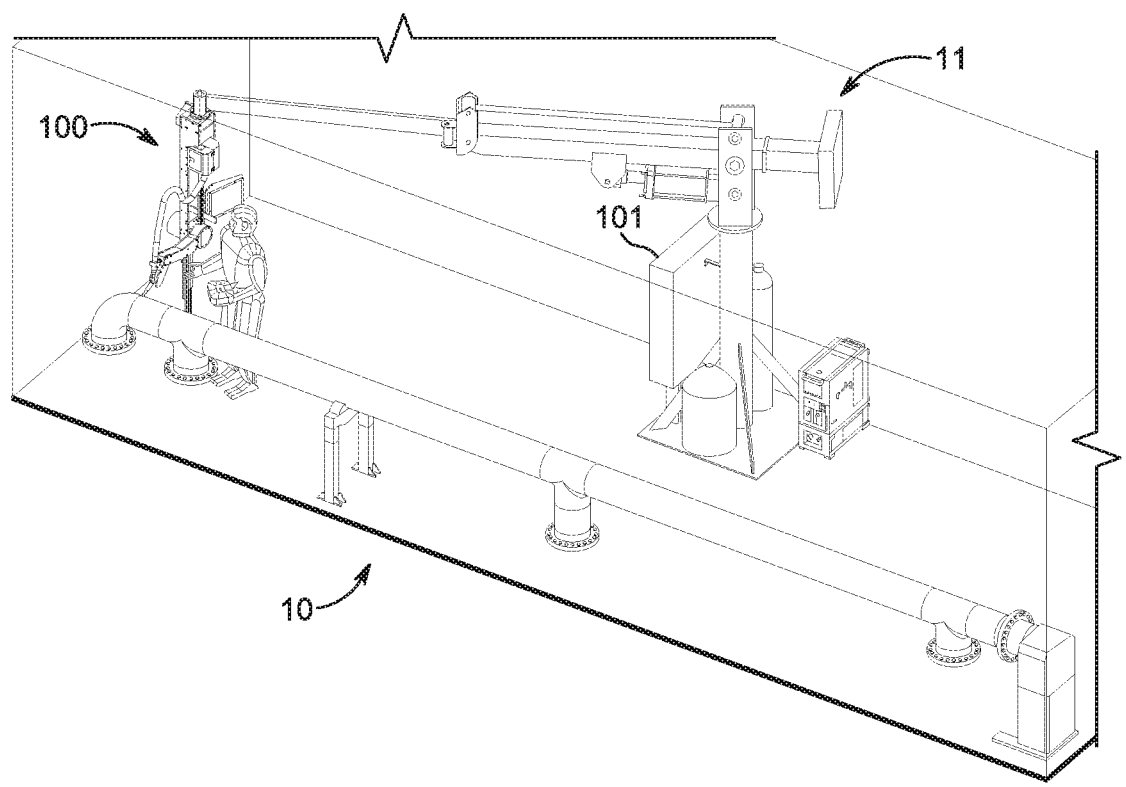
FIGS. 1A and 1B show the welding shop apparatus of FIG. 1 in an extended position.
Figure 1B:
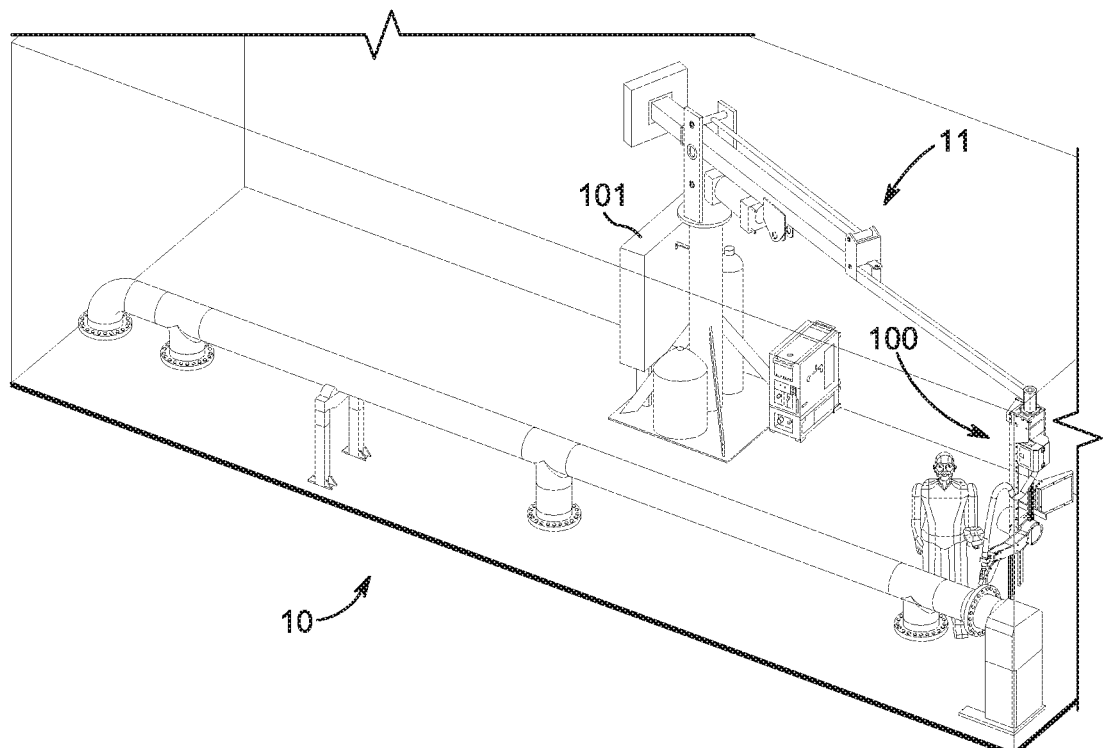

The present disclosure provides robotic welding systems and related apparatus and methods which may be used for welding together segments of pipe or other work pieces. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

FIGS. 1 and 1A-C show an example welding apparatus 10 comprising a repositionable support structure 11 supporting a robotic welding system 100. As described further below, the robotic welding system 100 is a "collaborative" robotic system, meaning that it is configured to be safely used alongside human operators. The present disclosure describes an example collaborative robotic welding system 100 configured to be supported by the repositionable support structure 11 such that an operator can move around a work area, but it is to be understood that the collaborative robotic welding system 100 described herein could be configured for use with other types of repositionable support structures.

In the illustrated example, the repositionable support structure 11 comprises a base 12, with a mast 14 extending upwardly therefrom and a first pivoting joint 16 atop the mast 14. The first pivoting joint 16 is configured to rotate about a substantially vertical axis. A first linkage 18 extends upwardly form the first pivoting joint 16. A first support arm 20 and a parallel arm 22 are pivotally connected between the first linkage 18 and a second linkage 28 at a front end of the first support arm 20. A counterweight 24 is attached to the back end of the first support arm 20, which is on the opposite side of the first linkage 18 from the front end. A hydraulic cylinder 26 is pivotally connected between the first linkage 18 and the first support arm 20 to assist in raising and lowering the front end first support arm 20. A second pivoting joint 30 configured to rotate about a substantially vertical axis connects a back end of a second support arm 32 to the second linkage 28. A third pivoting joint 30 configured to rotate about a substantially vertical axis at the front end of the second support arm provides a readily repositionable mounting point for supporting the robotic welding system 100. The robotic welding system 100 is coupled by cabling (not shown) to a controller 101, which may for example be positioned at or near the base 12 of the apparatus 10. The controller 101 may, for example, comprise one or more processors (e.g. in an industrial PC or the like), programmable logic controllers (PLCs), and drivers for operating the actuators of the robotic welding system 100.

Figure 1C:
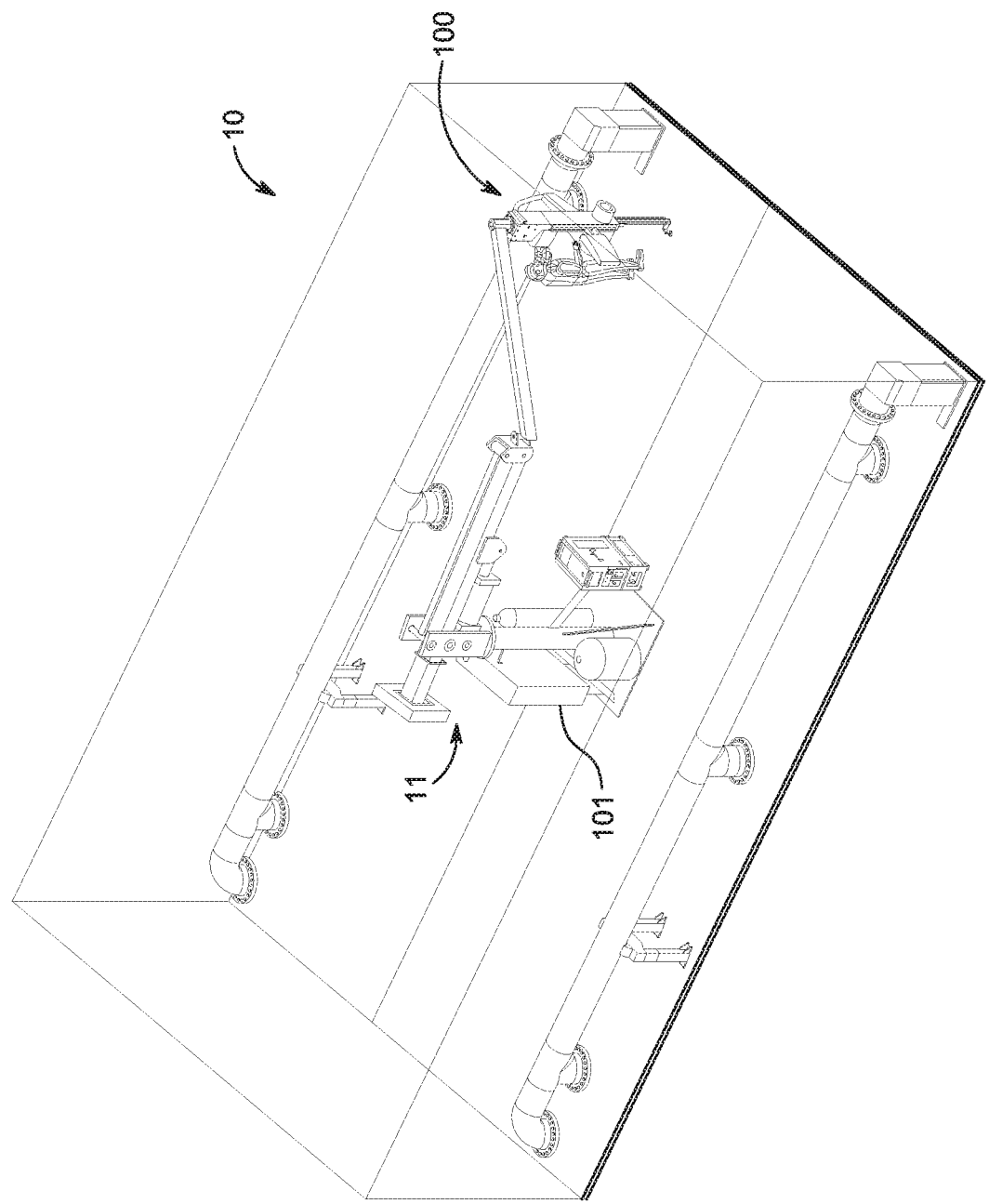
FIG. 1C shows the welding shop apparatus of FIG. 1 used for welding together two pipe strings on two separate positioners.

The example welding apparatus 10 of FIGS. 1 and 1A-C allows the robotic welding system 100 to be positioned at various heights and horizontal locations to weld workpieces at variable distances from the base 12 of the repositionable support structure 11 such that the apparatus 10 may be used for welding seams along long lengths of pipe. For example, in the example illustrated in FIG. 1, the apparatus 10 holds the welding system 100 in a position for welding a seam S between two pipe sections P1 and P2 relatively close to the base 12, and in FIGS. 1A and 1B the apparatus 10 holds the welding system 100 in positions for welding seams at opposite ends of the pipe string. As shown in FIG. 1C, the apparatus 10 may also be used for welding two separate pipe strings arranged on opposite sides of the base 12. In some embodiments, the repositionable support structure 11 is configured to support the robotic welding system 100 at various locations to support welding at any desired position along a pipe string with a length of 30 feet or more. The range of welding locations spanned by the apparatus 10 can vary depending on the size and configuration of the repositionable support structure 11.

In some embodiments, the repositionable support structure 11 comprises, for example, a support similar to that disclosed in U.S. Pat. No. 8,105,008 to Givens. In other embodiments, a different repositionable support structure may be used for supporting a collaborative robotic welding system such as system 100. For example, in some embodiments, a collaborative robotic welding system could be supported on a structure moveable along a track running along a shop floor, on a cart or other vehicle, such as an automatically guided vehicle (AGV), or other repositionable support structure.

FIGS. 2 to 5 show details of an example robotic welding system 100 according to one embodiment of the present disclosure. The robotic welding system 100 comprises a supporting arm 110 having a welding arm 140 configured to hold a welding torch 160 coupled thereto. The welding arm 140 extends in a generally horizontal direction toward a "front" or "welding" side of the supporting arm 110. A welder control assembly 130 is attached to a "back" or "operator" side of the supporting arm 110.

The welder control assembly 130 comprises user interface elements operably connected to the controller 101 that controls the operation of various actuators of the robotic welding system 100, as discussed below. In the illustrated example, the welder control assembly 130 comprises a handle 132, a support structure control 133, an emergency stop 134, and a touch screen display interface 136. An operator control pendant 122 (see FIG. 2) may also be provided for facilitating real-time interaction with the robotic welding system 100, for example by allowing a welder to interrupt or adjust a welding program being executed by the robotic welding system 100. The welder control assembly 130 may comprise hooks or the like (not shown) for holding the pendant 122 when it is not being held by an operator.

In an example embodiment, an operator can reposition the robotic welding system 100 by activating the support structure control 133, for example by pressing a button, pulling a lever, or activating other means, to release one or more braking systems of the repositionable support structure 11 and moving the system 100 with the handle 132. Hydraulic or pneumatic pressure may be utilized by the repositionable support structure 11 to assist in repositioning of the robotic welding system 100. When the robotic welding system 100 has reached the desired position, the operator can lock the position of the repositionable support structure 11, for example by releasing a button to engage one or more braking systems.

Referring to FIGS. 2, 2B, 3 and 4, in the illustrated example, the supporting arm 110 comprises a flanged member 112, which acts as a first mounting portion for connecting the to the repositionable support structure 11. A yaw rotary actuator 116 is connected to the first mounting portion and configured for rotating the supporting arm 110 about a substantially vertical yaw axis A1. In the illustrated example, the yaw rotary actuator 116 comprises an electric servo motor coupled to the flanged member 112 through a first gearbox 114 which reduces the speed of rotation such that the supporting arm 110 rotates slower than the servo motor. In other embodiments, the actuator may take different forms, such as a direct drive, a pneumatic actuator, a hydraulic actuator, or other type of actuator. The yaw rotary actuator 116 is connected to a second mounting portion, which in the illustrated embodiment takes the form of a horizontal mounting plate 115 connected between the yaw rotary actuator 116 and the gearbox 114, supporting arm support plates 111s extending down from the horizontal mounting plate 115, and a vertical mounting plate 119 connected between lower portions of the support plates 111s. The support plates 111s of the supporting arm 110 define an indented portion such that a lower portion of the supporting arm 110 is clear of the yaw axis A1. Various cover plates 111c are provided to cover the internal components of the supporting arm 110. In some embodiments the cover plates 111c may have a thickness of about 2 mm, whereas the support plates 111s may have a thickness of about 16 mm. A cable pass-through 117 (see FIG. 2B) provides access for cables (not shown) connecting the actuators of the robotic welding system 100 to the controller 101 and/or elements of the welder control assembly 130. A cable protector 118 is mounted on the inside of one of the cover plates 111c for containing cables running through the interior of the supporting arm 110.

A top plate 113 is connected between the supporting arm support plates 111s above the horizontal mounting plate 115. The top plate 113 has a U-shaped cutout sized to fit around the middle of the flanged member 112 and smaller than a lower lip (not shown) of the flanged member 112, such that in the event of a failure in the connection between the gearbox 114 and the flanged member 112, the weight of the supporting arm 110 is supported by the top plate 113. A wire feeder support plate 125 is connected between the support plates 111s for mounting a wire feeder 126. The wire feeder 126 provides welding wire for use by the welding torch 160.

Figure 2:
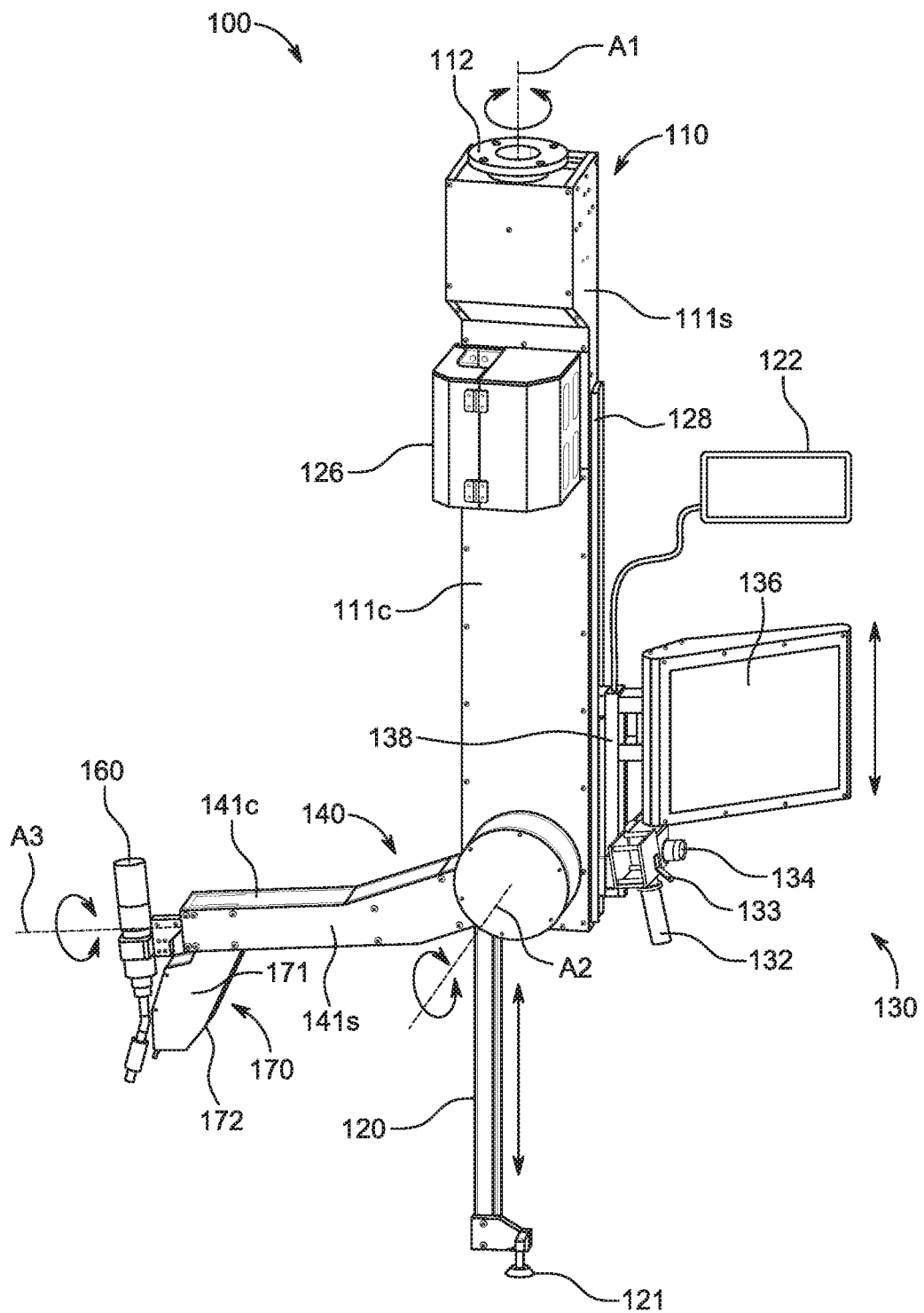
FIG. 2 shows an example robotic welding system in isolation.
Figure 2A:
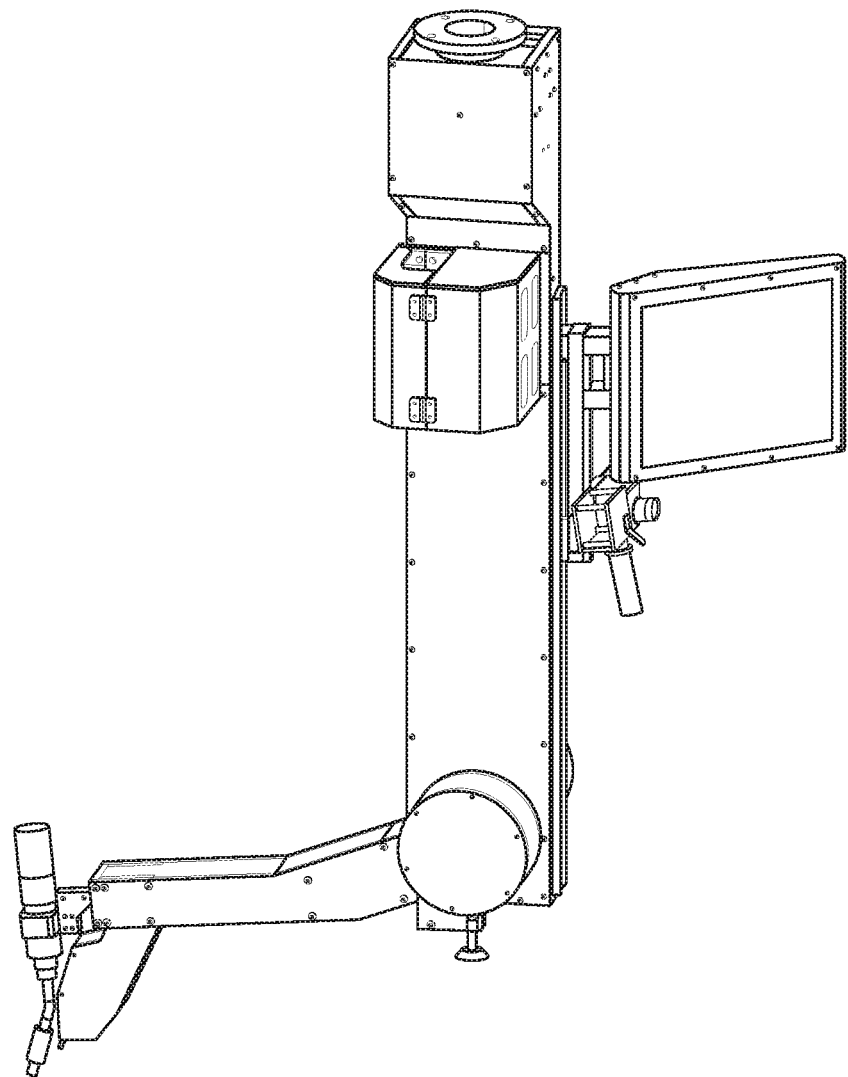
FIG. 2A shows the robotic welding system of FIG. 2 with the retractable stand in a retracted position and the welder control assembly in a raised position.
Figure 2B:
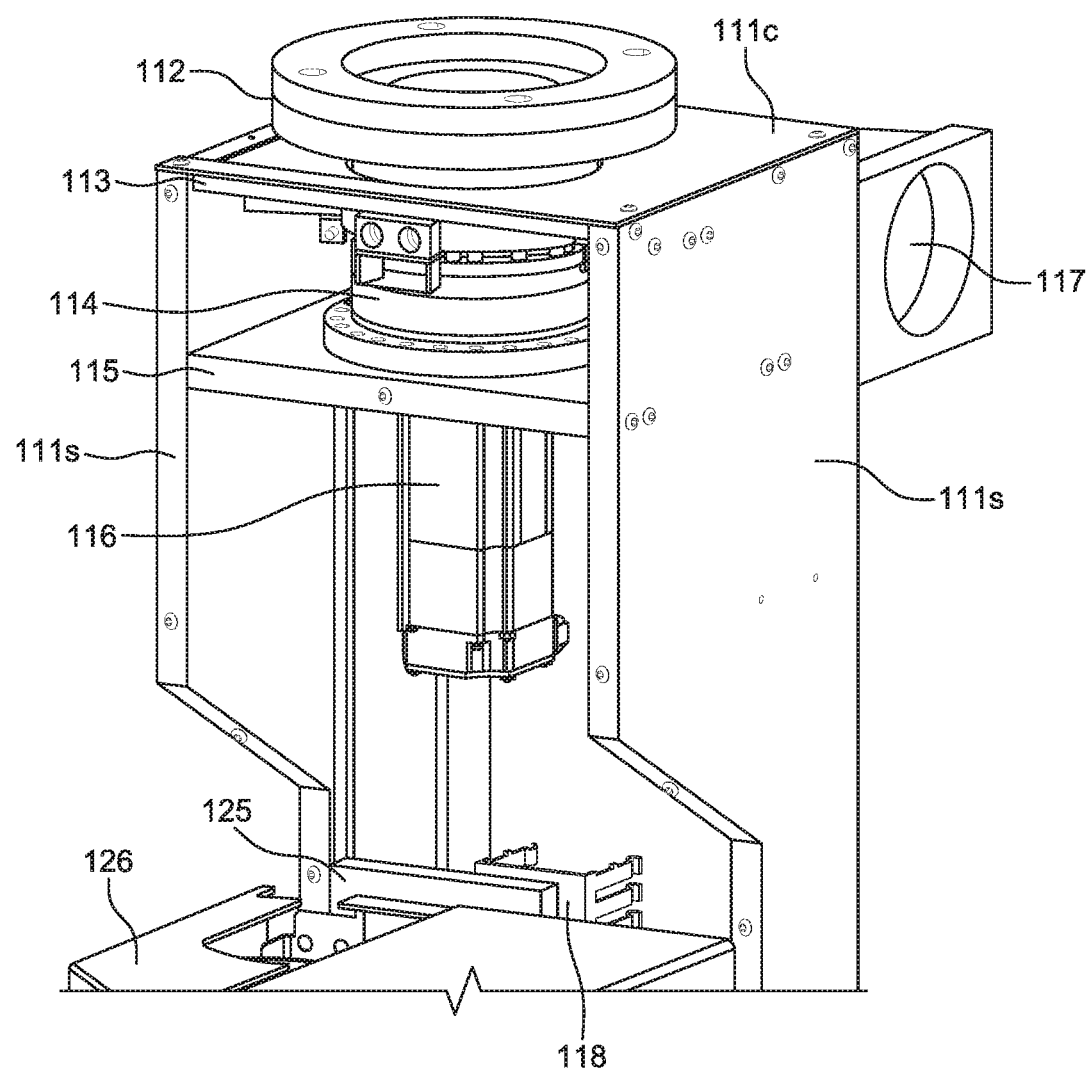
FIG. 2B shows an upper portion of the supporting arm of the robotic welding system of FIG. 2 with certain plates removed to illustrate internal components.
Figure 2C:
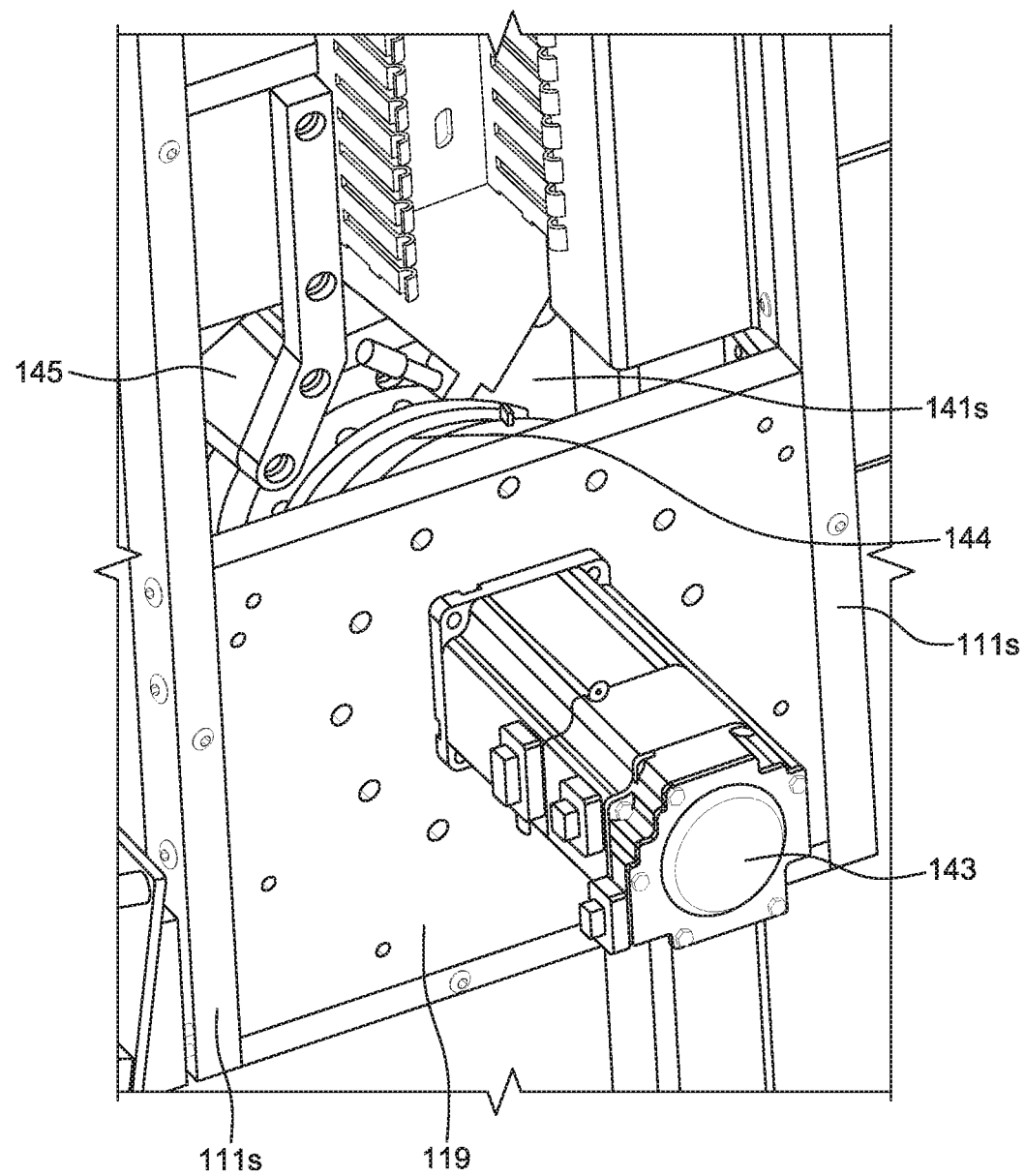
FIG. 2C shows a lower portion of the supporting arm of the robotic welding system of FIG. 2 with certain plates removed to illustrate internal components.
Figure 2D:
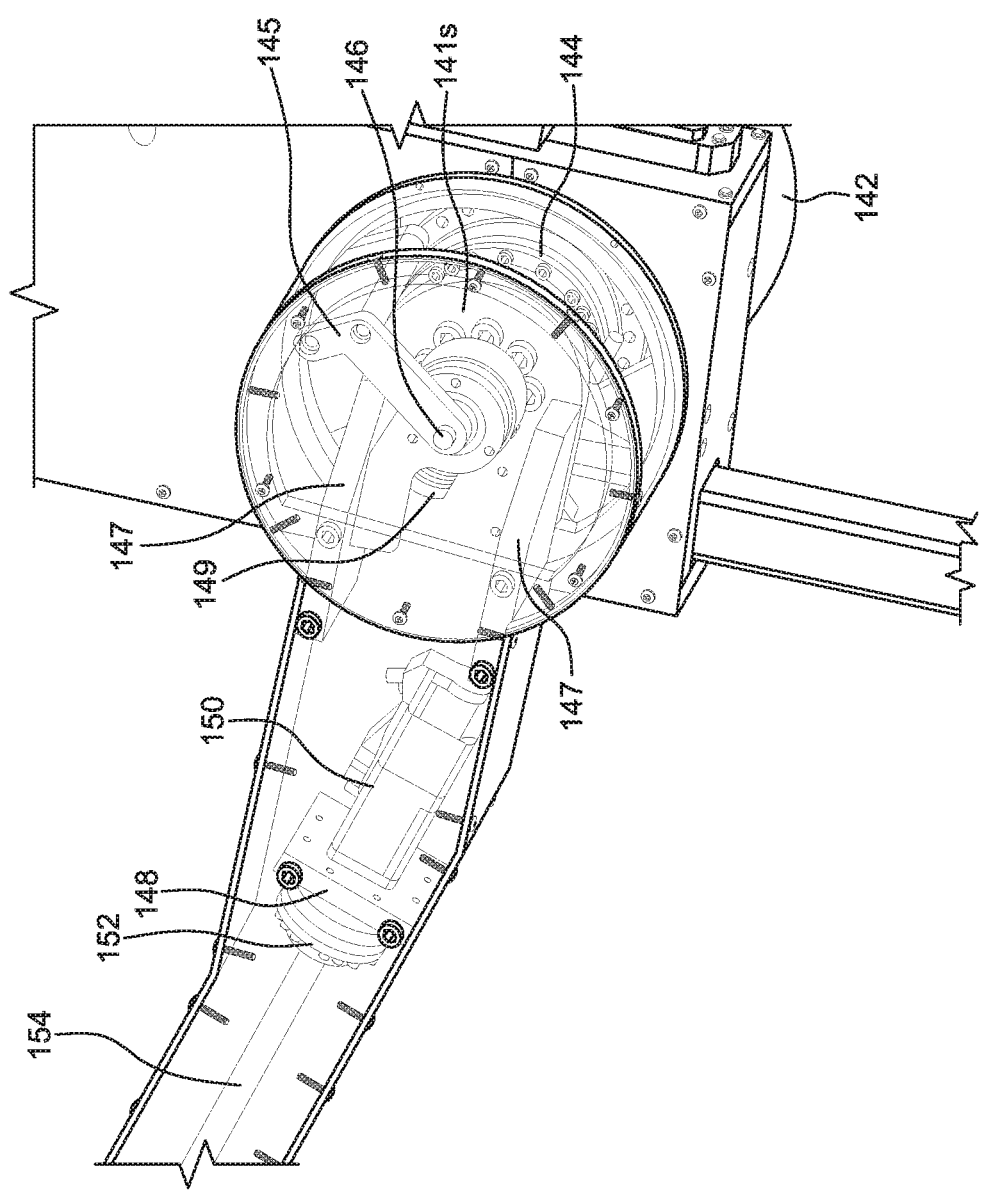
FIG. 2D shows the interface between the welding arm and the supporting arm of the robotic welding system of FIG. 2 with certain plates shown transparently to illustrate internal components.
Figure 3:
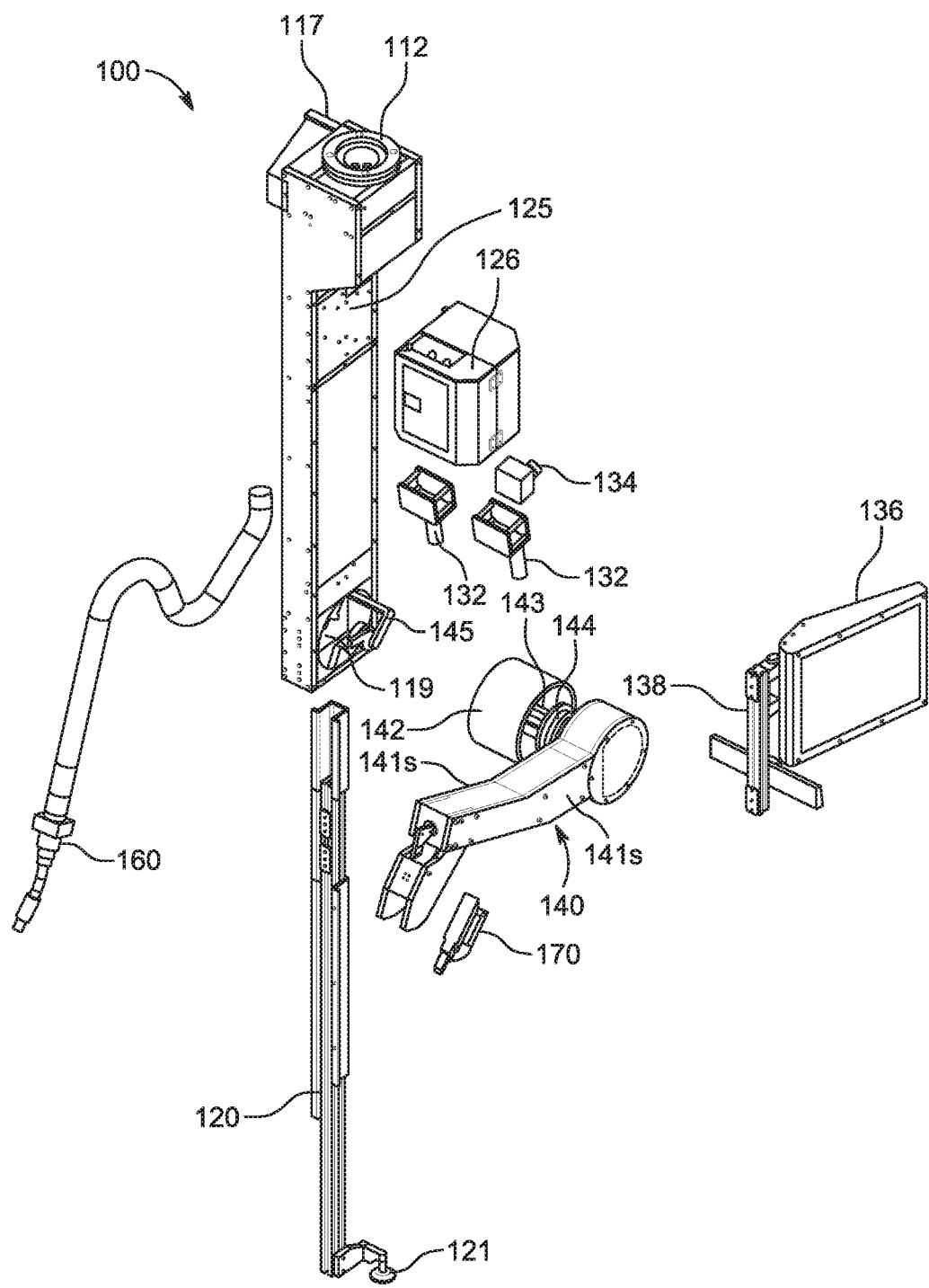
FIG. 3 is a partially exploded view of the robotic welding system of FIG. 2.
Figure 4:
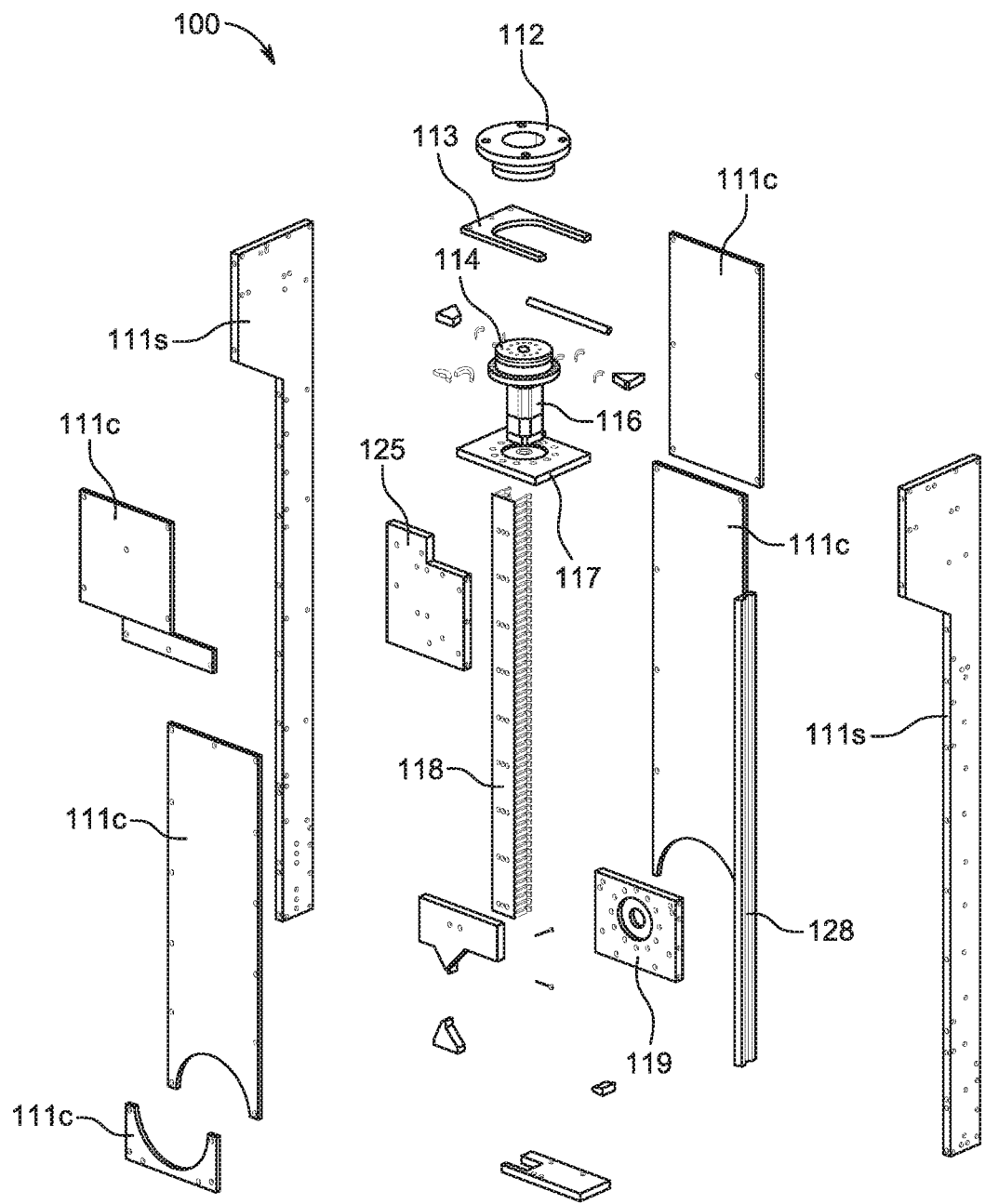
FIG. 4 is an exploded view of the supporting arm of the robotic welding system of FIG. 2.
Figure 5:
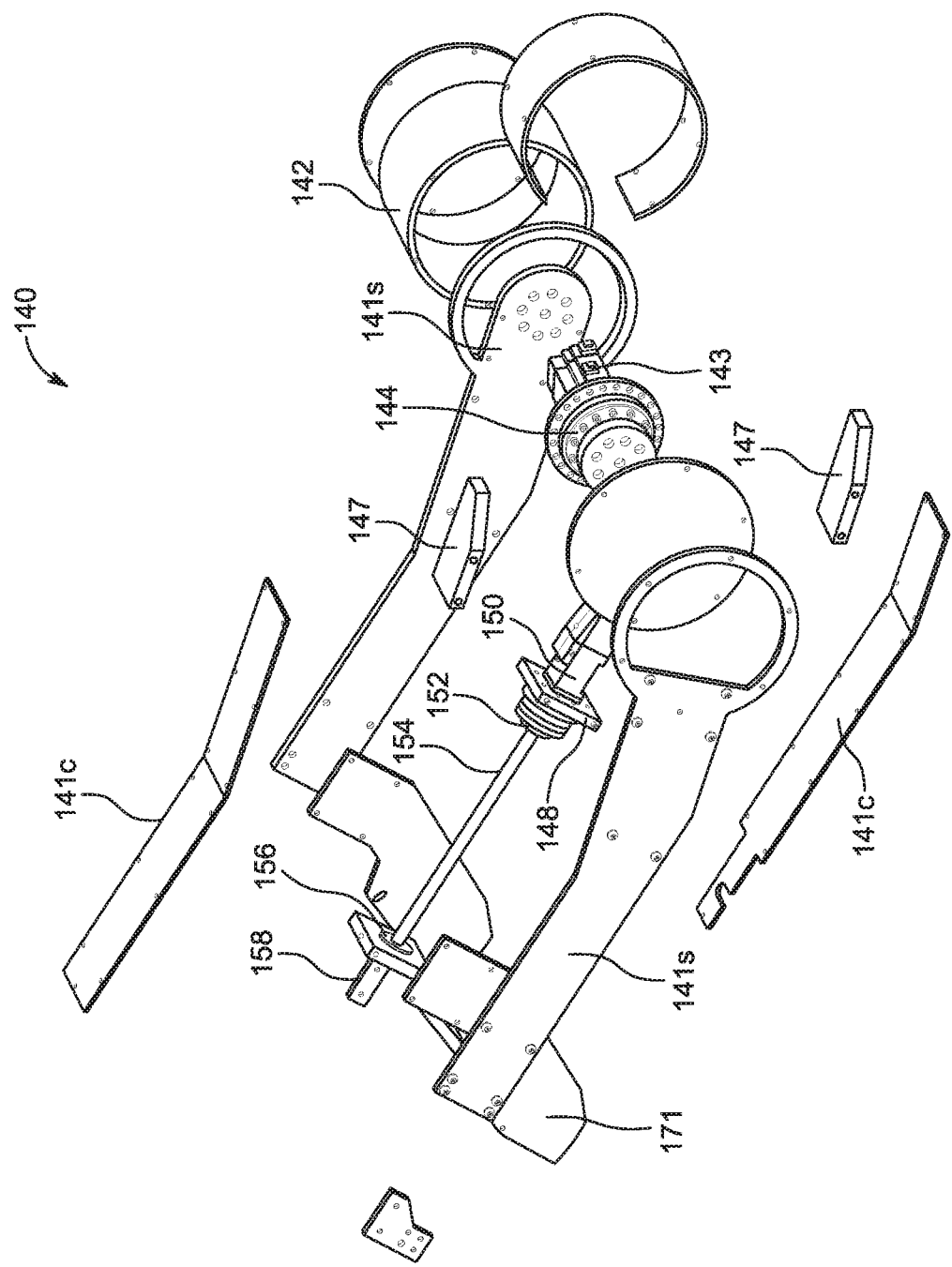
FIG. 5 is an exploded view of the welding arm of the robotic welding system of FIG. 2.

In the illustrated example, a retractable stand 120 is adjustably connected to the supporting arm 110, and is moveable between an extended position shown in FIG. 2 and a retracted position shown in FIG. 2A. A foot 121 is laterally offset from the body of the stand 120, such that the foot 121 is aligned with the yaw axis A1. The retractable stand 120 may be deployed such that the foot 121 sits on a shop floor when the robotic welding assembly 100 is in a working position, allowing the robotic welding assembly 100 to pivot on the yaw axis A1 while providing additional stability at a range of different operating heights.

In the illustrated example, the welder control assembly 130 is mounted on a sliding connector 138 configured to be received in a track 128 attached to the support plate 111s on the back side of the supporting arm 110. The welder control assembly 130 may be readily adjusted to a more ergonomic position for the operator when the robotic welding assembly 100 is in a working position at a range of different operating heights.

Referring to FIGS. 2, 2C, 2D, 3 and 5, in the illustrated example a pitch rotary actuator 143 is connected to the vertical mounting plate 119 and is configured for rotating the welding arm 140 about a substantially horizontal pitch axis A2 with respect to the supporting arm 110. A cylindrical cover 142 covers the pitch rotary actuator 143, which extends outwardly from the supporting arm 110. In the illustrated example, the pitch rotary actuator 143 comprises an electric servo motor coupled to a welding arm support plate 141s, which forms part of a third mounting portion, through a second gearbox 144. The second gearbox 144 reduces the speed of rotation such that the welding arm 140 rotates slower than the servo motor. In other embodiments, the actuator may take different forms, such as a direct drive, a pneumatic actuator, a hydraulic actuator, or other type of actuator. A welding arm support linkage 145 is connected to the support plates 111s of the supporting arm 110, and supports a welding arm axle 146 about which the welding arm 140 rotates. Internal support plates 147 are connected between the welding arm support plate 141s to which the gearbox 144 is connected and another welding arm support plate 141s on the opposite side of the welding arm 140. A shaft mounting plate 148 is connected between the welding arm support plates 141s, for mounting a roll rotary actuator 150 as described below. The internal support plates 147 and shaft mounting plate 148, together with the welding arm support plates 141s form the third mounting portion. Various cover plates 141c are provided to cover the internal components of the welding arm 140.

A safety encoder 149 is mounted on or near the welding arm axle 146. The pitch rotary actuator 143 has its own encoder associated therewith, which accurately measures the position of the pitch rotary actuator 143. The safety encoder 149 is less accurate but more robust than the encoder of the pitch rotary actuator 143, and provides feedback to the controller 101 such that the controller 101 can implement safety control protocols to limit the force applied by the pitch rotary actuator 143, such that the robotic welding system 100 is safe for use as a collaborative robot (e.g. a robot configured to work closely alongside an operator). Thus, if for example an operator's hand is between the welding arm 140 and the supporting arm 110 when the welding arm 140 is being raised by the pitch rotary actuator 143, the safety control protocols prevent the operator's hand from being crushed. In some embodiments, safety encoders and related safety control protocols may also be provided for limiting the force applied by the yaw and roll rotary actuators 116 and 150.

The roll rotary actuator 150 is configured for rotating a torch holder shaft 154 about a roll axis A3 substantially perpendicular to the pitch axis A2, and is connected to the shaft mounting plate 148. In the illustrated example, the roll rotary actuator 150 comprises an electric servo motor coupled to the torch holder shaft 154 through a third gearbox 152. The third gearbox 152 reduces the speed of rotation such that the torch holder shaft 154 rotates slower than the servo motor. In other embodiments, the actuator may take different forms, such as a direct drive, a pneumatic actuator, a hydraulic actuator, or other type of actuator. The torch holder shaft 154 is thus pivotable along an arc that lies substantially within the same plane as the yaw axis A1. A torch mounting portion 158 configured for mounting the welding torch 160 is connected to the end of the torch holder shaft 154. A bearing assembly 154 connected between the front ends of the welding arm support plates 141s supports the front end of the torch holder shaft 154.

A sensor cover 171 extends from a lower front portion of the welding arm 140 near the welding torch 160 to provide protection for a sensor assembly 170. The sensor assembly 170 may, for example, comprise a laser sensor utilized to determine a distance between the welding head of the welding torch 160 and the object being welded, such as a seam S at the interface of a pair of pipe segments P1, P2. The sensor assembly 170 may, for example, comprise a camera which captures a reflected image of the welding area from a mirror 172 (see FIG. 2) extending from the underside of the welding arm 140. The camera captures a real-time welding image for display on touch screen display interface 136 or another display. Signals from the sensor assembly 170 may be sent to the controller 101 that actuates the yaw rotary actuator 116, the pitch rotary actuator 143, and the roll rotary actuator 150 based on the signals received from the sensor assembly 170 in order to finely position the welding torch 160. In other embodiments, an operator may monitor the signals from the sensor assembly 170 and manually control yaw rotary actuator 116, the pitch rotary actuator 143, and the roll rotary actuator 150 in order to finely position the welding torch 160.

In an example pipe welding operation, pipe segments P1, P2 may be held together by clamps or straps or the like (not shown) such that the longitudinal axes of the pipe segments P1, P2 are substantially aligned and the pipe segments P1, P2 are supported by a pipe positioner (not shown). The robotic welding system 100 is coarsely positioned by actuating the repositionable support structure 11. Coarse positioning of the robotic welding system 100 may be automated or may be carried out by an operator.

After coarse positioning, the welding torch 160 is finely positioned proximate to the seam S at the interface of the pipe segments P1, P2. Fine positioning of the welding torch 160 may be automated or may be carried out by an operator controlling the yaw rotary actuator 116, the pitch rotary actuator 143, and the roll rotary actuator 150.

After the welding torch 160 is finely positioned proximate the seam S, the pipe positioner rotates the pipe segments P1, P2 around the longitudinal axes of the pipe segments P1, P2. As the pipe segments P1, P2 rotate, the welding torch 160 welds the pipe segments P1, P2 together at the seam S. During welding, the motion of the torch holder shaft 154, and thus the welding torch 160 is controlled by the controller, and may be finely positioned to adjust for, for example, contour of the surfaces of the pipe segments P1, P2. Fine positioning during welding may be automated based on the signals received from the sensor assembly 170.

The robotic welding assembly 100 may be utilized to weld the pipe segments P1, P2 using a multiple pass welding process. FIG. 6 shows a cross section of a wall of pipe segments P1, P2 that have been welded along the seam S using a multiple pass welding process. Pipe segments P1, P2 have respective ends 402, 404 that are cut at an angle such that the seam S is narrower toward the inner surfaces 406, 408 of the pipe segments P1, P2. During welding, the seam S is filled during multiple passes of the welding torch 160, each pass depositing a weld, four of which are separately labelled as 410a-d. The multiple pass weld shown in FIG. 6 includes approximately forty welds.

In spool welding, multiple pass welding is utilized to provide a uniform weld with a constant parameter for each pass. In some embodiments, the robotic welding assembly 100 may be configured to utilize a program to automatically execute a multiple pass welding process in which welds 410a-d are made in different positions relative to each other in order to weld the seam S of the pipe segments P1, P2. The program may control the welding torch 160 to carry out each pass having a different specification including, for example, voltage, wire speed, and weld speed.

The present disclosure describes a robotic welding assembly for use in spool welding pipe segments in a pipe fabrication facility. The described embodiments are to be considered in all respects only as illustrative and not restrictive. The scope of the claims should not be limited by the embodiments set forth in the examples, but should be given the broadest interpretation consistent with the description as a whole. All changes that come with meaning and range of equivalency of the claims are to be embraced within their scope.

The invention claimed is:

1. An apparatus comprising:
a repositionable support structure; and
a collaborative robotic welding system attached to the repositionable support structure, the collaborative robotic welding system comprising a supporting arm, a welding arm comprising a torch holder shaft for mounting a welding torch, a plurality of rotary actuators for moving the supporting arm, the welding arm and the torch holder shaft, wherein the plurality of rotary actuators consist of a yaw rotary actuator rotatable about a yaw axis, a pitch rotary actuator rotatable about a pitch axis, and a roll rotary actuator rotatable about a roll axis, a safety encoder associated with the pitch rotary actuator and mounted on or near an axle of the welding arm, and a controller operably coupled to the plurality of rotary actuators and the at least one safety encoder and configured to control motion of the robotic system while limiting a force applied by the pitch rotary actuator,
wherein the collaborative robotic welding system has only three degrees of freedom, namely a first degree of freedom about the yaw axis, a second degree of freedom about the pitch axis, and a third degree of freedom about the roll axis, and wherein the controller is configured to control motion of the torch holder shaft to cause a welding torch to execute a multiple pass spool welding pattern using only the three degrees of freedom.

\* \* \* \* \*